United States Patent [19]
Hoegger

[11] Patent Number: 5,409,097
[45] Date of Patent: Apr. 25, 1995

[54] LOADING AND UNLOADING ARRANGEMENT

[76] Inventor: Cornel Hoegger, Weideggstrasse 35, CH-9230 Flawil, Switzerland

[21] Appl. No.: 60,170

[22] Filed: May 7, 1993

[51] Int. Cl.$^6$ .............................................. B65G 37/00
[52] U.S. Cl. .............................. 198/463.2; 198/468.1; 99/443 C; 99/386; 99/479
[58] Field of Search ............ 198/429, 430, 433, 463.2, 198/468.1; 414/217; 99/443 C, 386, 478, 479

[56] References Cited

U.S. PATENT DOCUMENTS

| | | | |
|---|---|---|---|
| 1,636,429 | 7/1927 | Olson | 198/463.2 |
| 2,920,552 | 1/1960 | Kaap | 414/217 |
| 2,980,038 | 4/1961 | Royer | 198/468.1 |
| 3,202,115 | 8/1965 | Jones | 198/468.1 |
| 3,384,218 | 5/1968 | Messerly et al. | 198/463.2 |
| 3,520,396 | 7/1970 | Lingg | 198/463.2 |

*Primary Examiner*—Joseph E. Valenza

[57] ABSTRACT

The object of the invention is to provide a loading and unloading arrangement that makes it possible to have timesaving loading and unloading of a conveyor of a processing equipment unit, whether it is in an autoclave or in a storage unit or in some other kind of processing equipment unit such as for brewing or boiling or for freezing. For conducting the piece goods (S) to or from a loading and unloading device (1.1, 1.2), a primary conveying device (PF) is provided for the conveyor (F). The piece goods (S) are moved to or from a feeder conveyor (1.9, 2.8) with this primary conveying device. The piece goods (S) are moved from the feeder conveyor (1.9, 2.9) to the conveyor or from the latter with the transfer devices (U1, U2, U3). This kind of arrangement permits a rapid exchange of the piece goods between the freshly supplied goods and processed goods because conveyance to or from on the one hand and loading and unloading on the other hand can be carried out at intervals from one another.

5 Claims, 7 Drawing Sheets

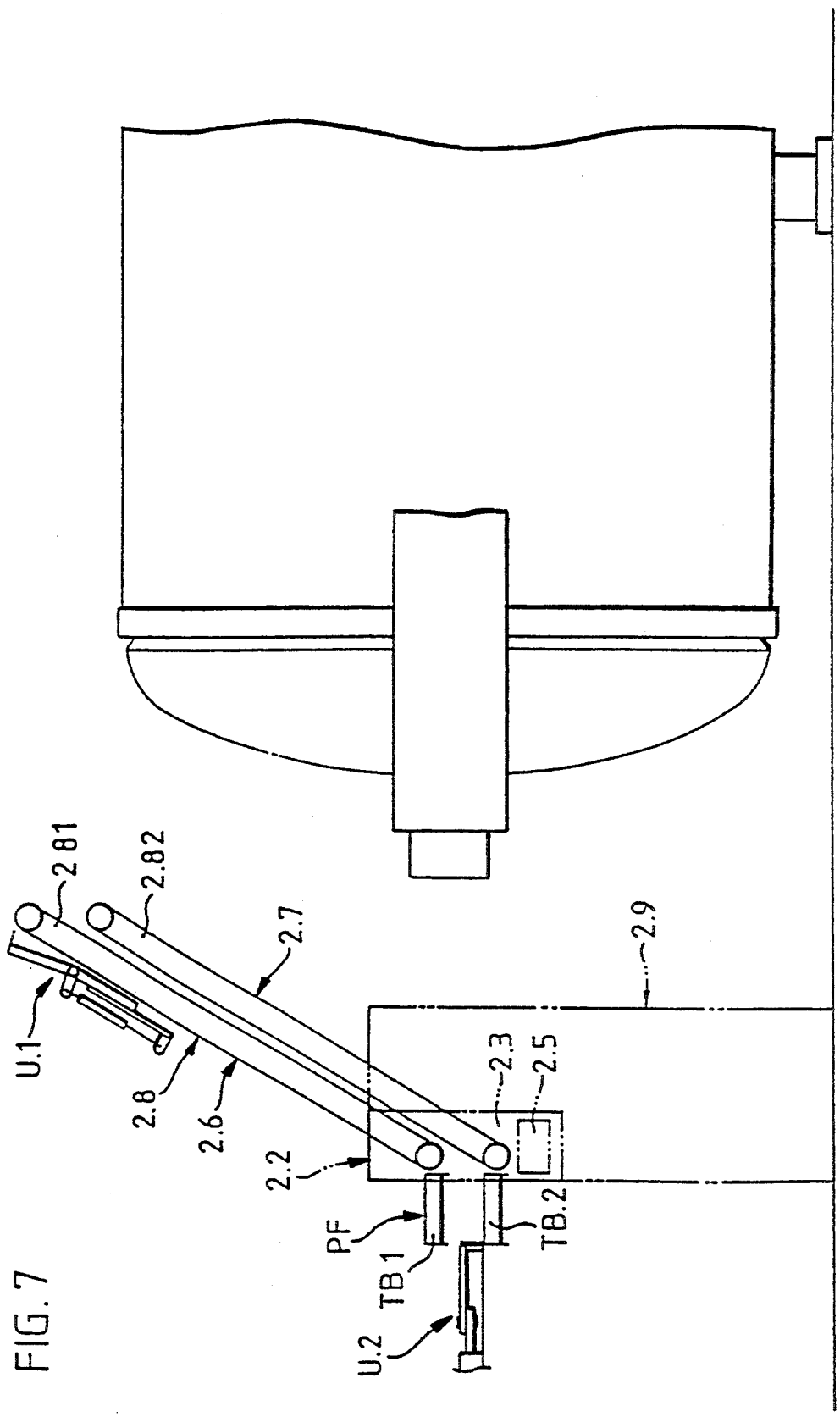

LOADING AND UNLOADING ARRANGEMENT

The present invention relates to a loading and unloading arrangement for conveying piece goods to and from a conveyor conducting the piece goods around in a processing equipment unit, said conveyor being a moving belt or a means of conveyance moving trays or baskets in accordance with the introductory part of claim 1.

According to GB-A-2 037 247, an example arrangement of this kind includes a feeder arranged transversely to a conveyor belt to be charged with piece goods. This feeder, that is, the end thereof facing away from the conveyor belt to be charged, is provided with transfer means with which the piece goods delivered on the feeder are to be transferred to a further conveyor belt in the processing device. These transfer means include a pusher strip that has a width corresponding to the conveyor belt and can be moved back and forth to transfer the piece goods in measured amounts to the further conveyor belt.

This kind of arrangement is suitable for only one operating mode, that is, either loading or unloading. For example, to exchange the products and the charge of an autoclave in a short time, a means of transfer for unloading and loading must be provided at the same time in both directions, and this requires a loading and an unloading device. Only this way can an autoclave be utilized to the fullest extent.

It is thus an object of the invention to provide a loading and an unloading arrangement making it possible to have timesaving loading and unloading of the conveyor of a processing equipment unit, whether it is for an autoclave or a storage unit or some other kind of processing equipment such as for brewing or boiling or for freezing.

This is achieved by the invention in that, for conducting the piece goods to or from a loading and unloading device for the conveyor, a primary conveying device is provided with which the piece goods can be conducted to or from a feeder conveyor, and in that transfer means are arranged in front of the conveyor to conduct the piece goods from the feeder conveyor to the conveyor or from the latter.

The invention is explained in more detail below using example embodiments.

FIG. 7 is a side view of the second embodiment in the rest position.

Figure 1:
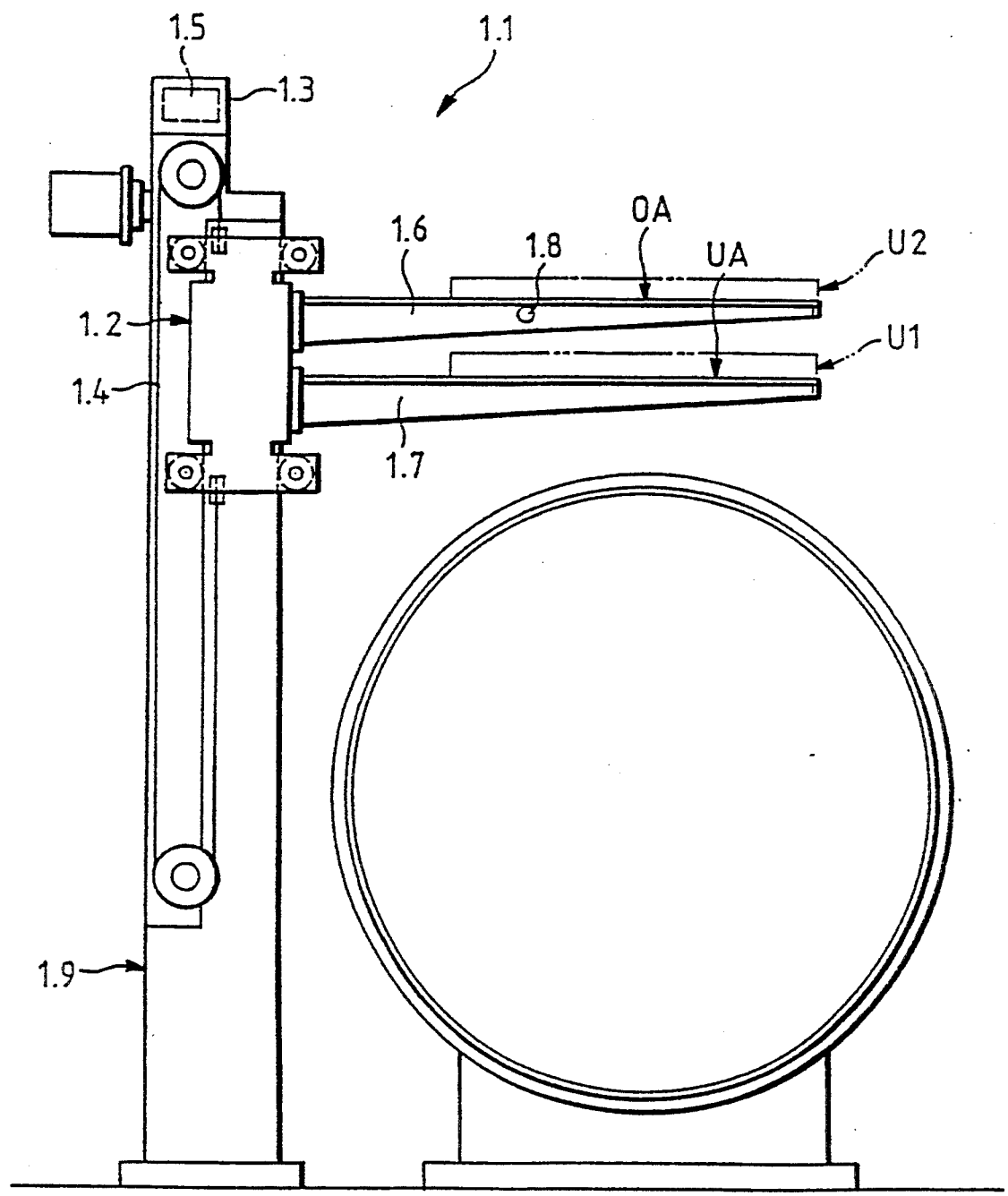
FIG. 1 is a front view of an autoclave housing with a loading and unloading arrangement in a first embodiment in a first operating position.
Figure 2:
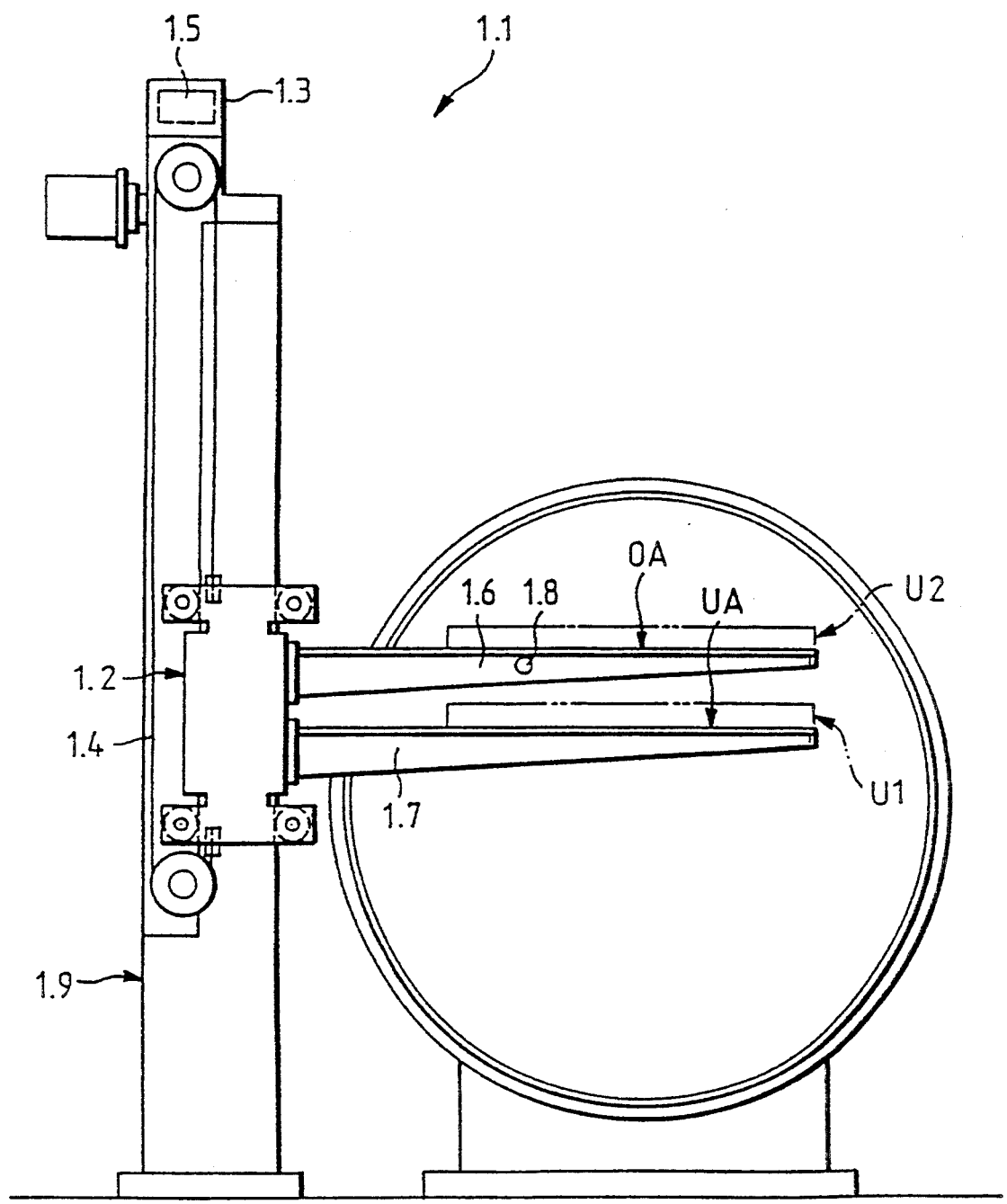
FIG. 2 is the same front view as in FIG. 1 with the loading and unloading arrangement in a second operating position.

According to the first embodiment as shown in FIG. 1 and 2, there is a column 1.9 with a car thereon guided for upward and downward movement along with its drive and control unit 1.3. For extremely rapid movement, a so-called quadrant drive 1S provided, which moves the car by means of a toothed transmission belt. For loading and for unloading, the car has brackets 1.6 and 1.7 on which are mounted an upper working platform OA and a lower working platform UA. Each of these working platforms supports a transfer device U1 and U2.

Figure 3:
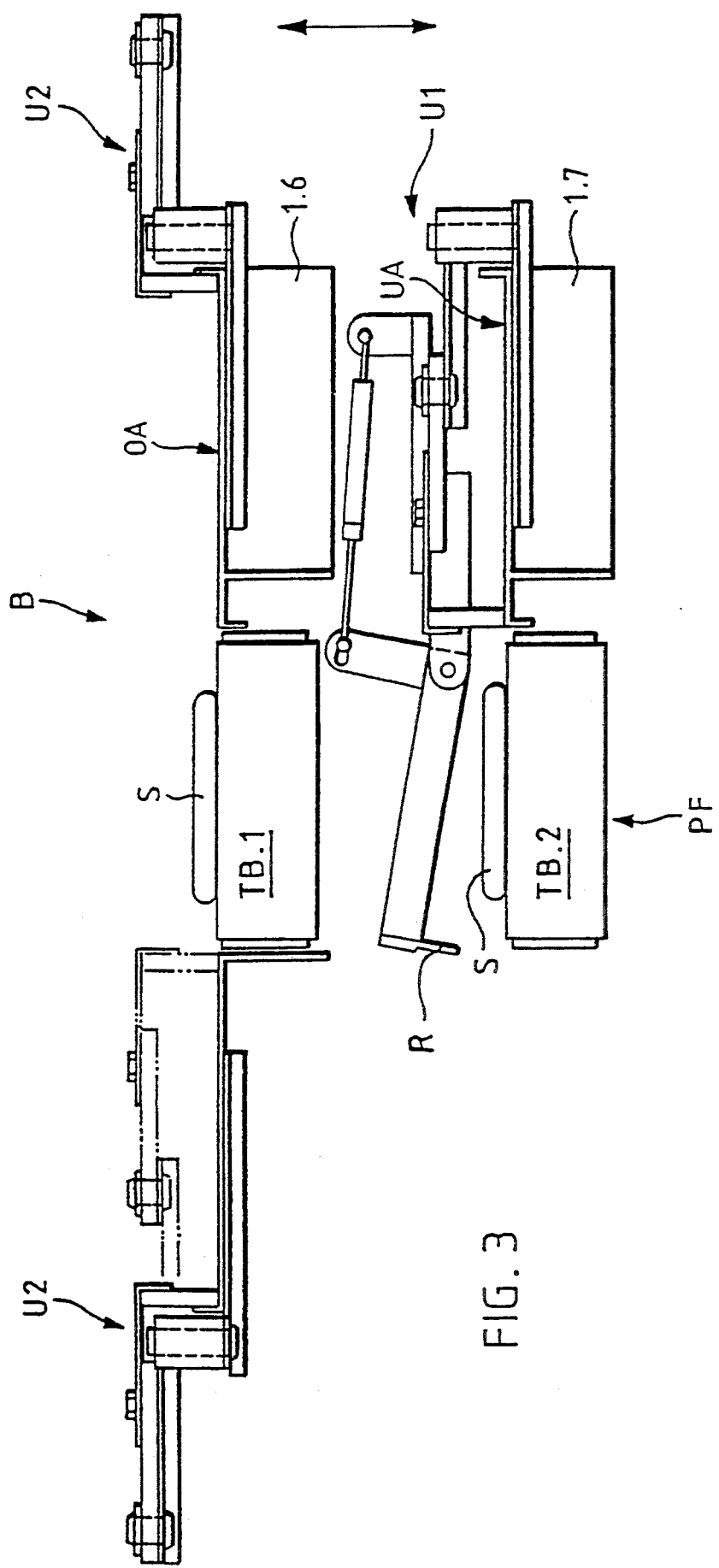
FIG. 3 shows the loading and unloading device in the position shown in FIG. 1 in a side view from the right in FIG. 1 leaving out the column and the car.

FIG. 3 shows a side view of primary conveying device PF with an upper conveying belt TB.1 and a lower conveying belt TB.2. The unloading of the conveyor belt TB.2 is carried out by means of a first transfer device U1 in the form of a rake that is able to carry out upward and downward motion besides translational motion so that the rake R moves over the piece goods S brought up with the lower conveyor belt TB.2 and then drops down behind them and moves them to the lower working platform UA by sliding along the conveyor belt TB.2.

Figure 4:
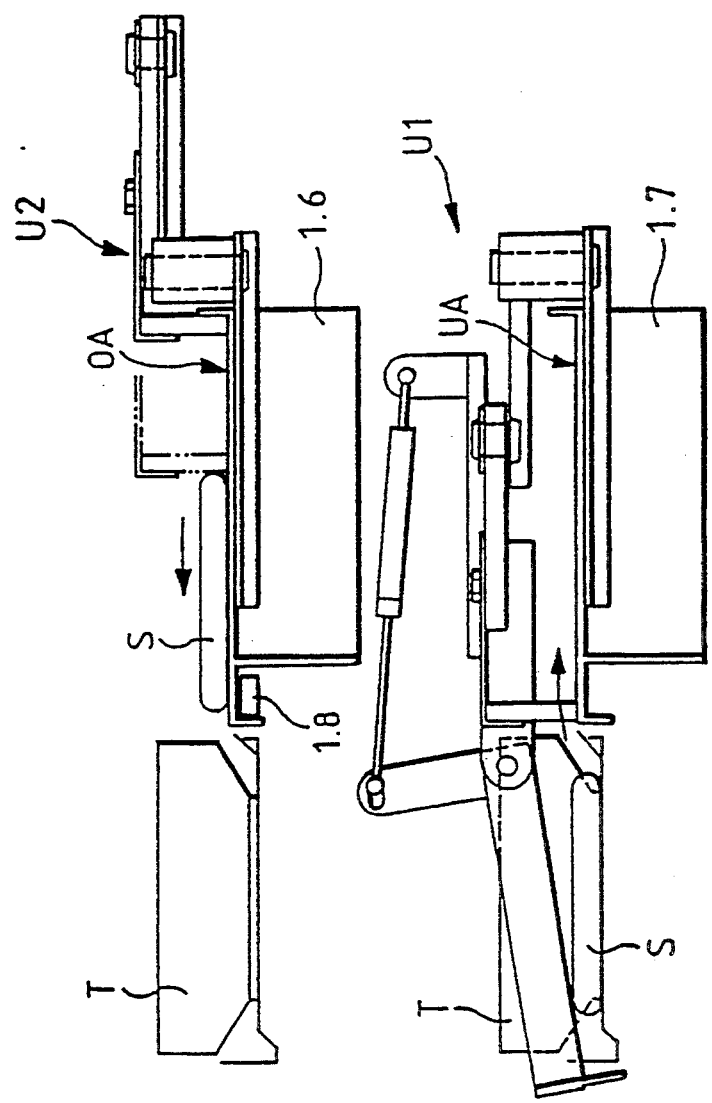
FIG. 4 shows the loading and unloading device in a position shown in FIG. 2 in front of the loading and unloading port of the autoclave.

The second transfer device U2 is designed as a simple push rod for pushing the piece goods 5 located on the upper working platform OA onto the conveyor belt TB.1. The loading and unloading of the conveyor belts TB.1 and TB.2 is carried out in an end position according to FIG. 1. The car 1.2 with piece goods S on the upper working platform OA to be fed to the autoclave is then run downwards into the position according to FIG. 2 where a bottom tray T is unloaded and an upper tray is loaded by means of the same transfer devices U1 and U2 (FIG. 4). The drawing also shows that the rake R is raised according to FIG. 3 and lowered according to FIG. 4.

Figure 5:
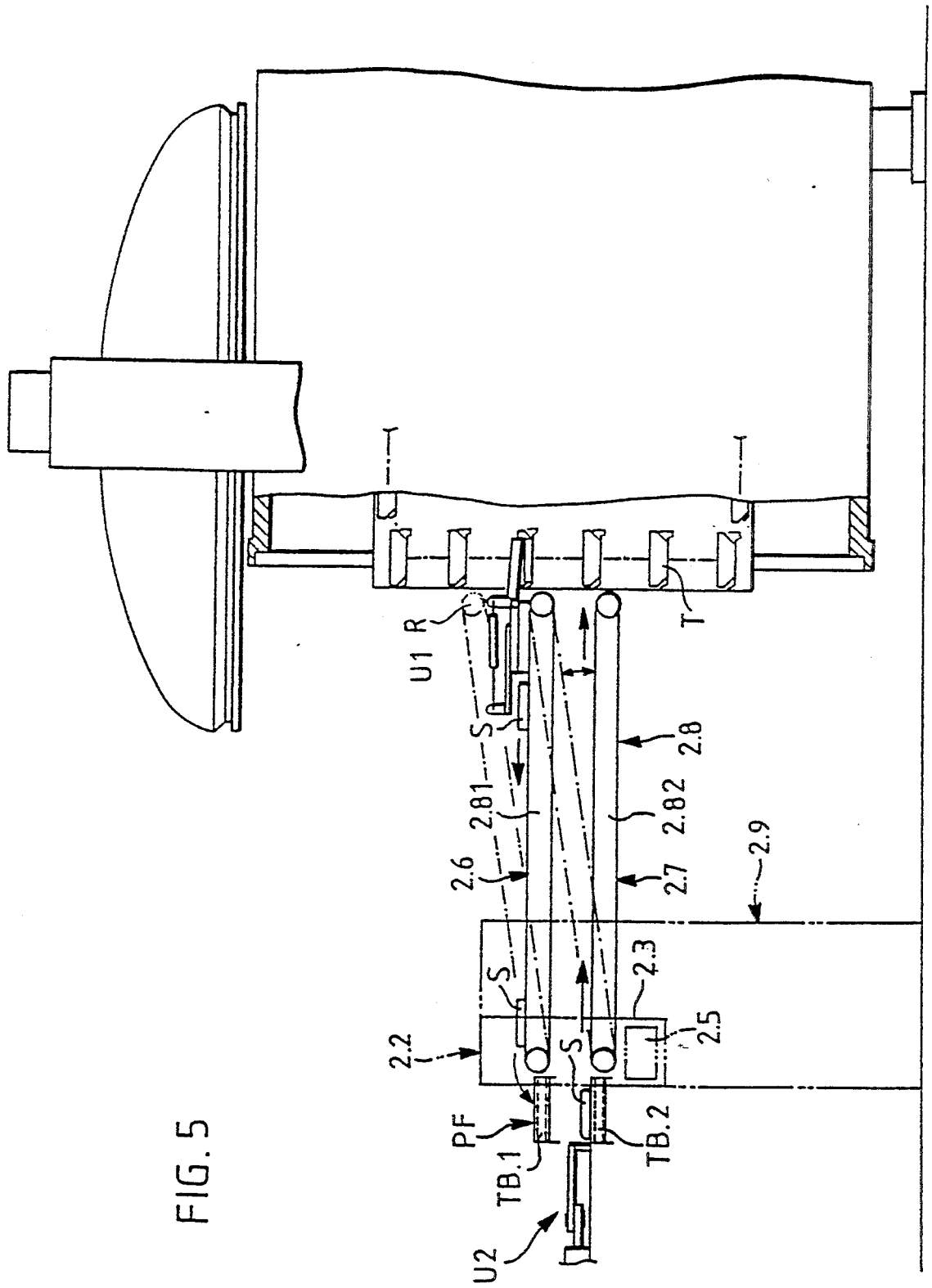
FIG. 5 shows a second embodiment of a loading and unloading arrangement with trays on the loading and unloading side of an autoclave.
Figure 6:
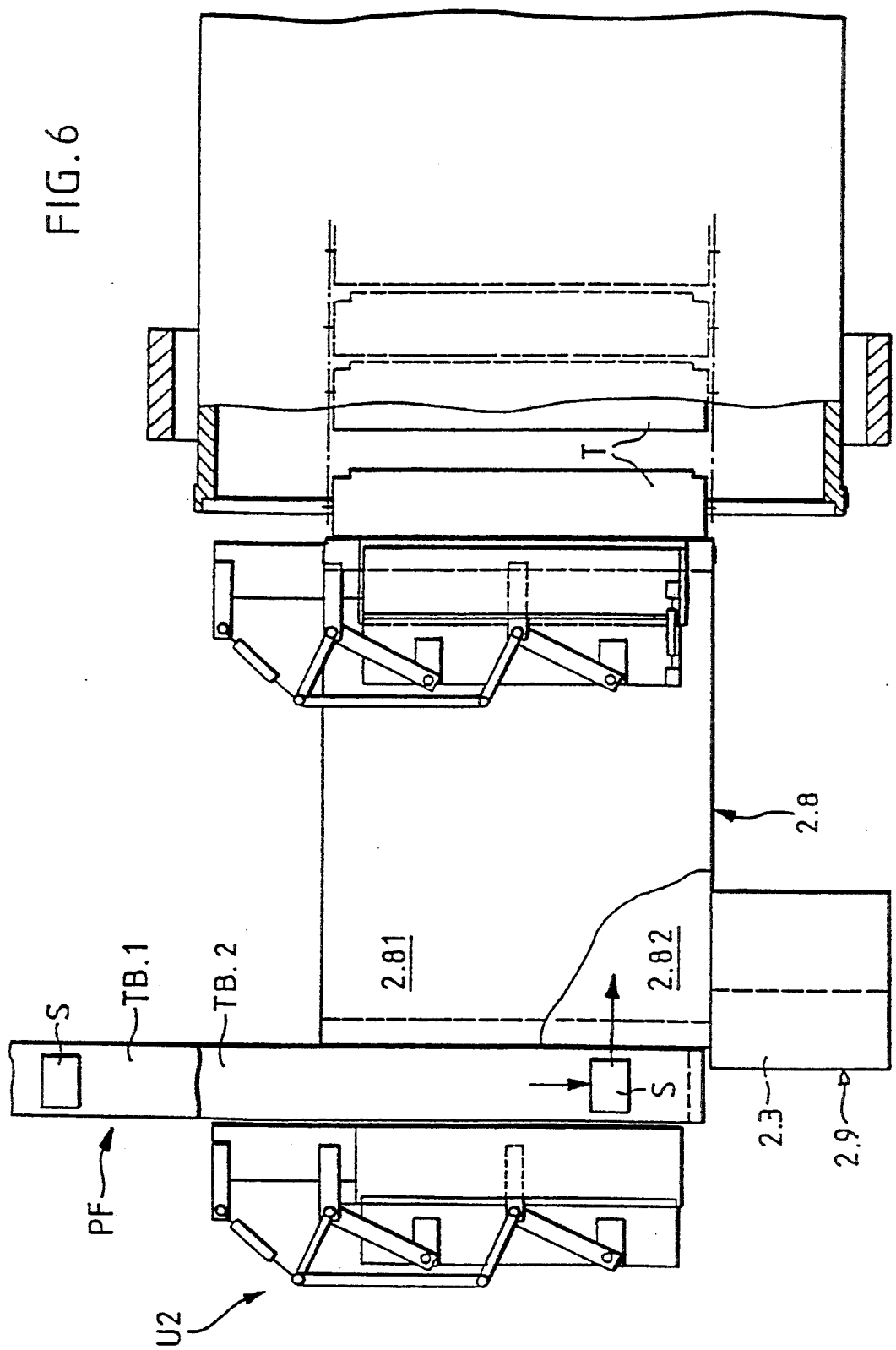
FIG. 6 is a plan view of the arrangement according to FIG. 5.

FIG. 5 and 6 show the loading side of an autoclave, a number of trays T being shown moving vertically from the top track to the bottom track. Thus the tray must be unloaded at the top and the tray located below can then be loaded. The movement to and from of the piece goods S is carried out here, however, with a secondary conveying device 2.8. The primary conveying device PF with the two conveyor belts TB.1 and TB.2 is shown again to the left in the figure. By means of a push rod with a design similar to or identical with the push rod of the transfer device U2 in FIG. 3, the piece goods S brought up by the primary conveying device TB.2 is pushed onto the lower conveyor belt 2.82 of the secondary conveying device 2.8 and is transferred directly to an empty tray T with this secondary conveyor belt 2.82.

Removal of the processed piece goods S from an upper tray T is carried out by means of a rake R with a design similar to or identical with that of the transfer device U1 shown in FIG. 3 in order to be brought to the upper conveyor belt 2.81 of the secondary conveying device 2.8. The delivery of the piece goods S from this upper conveyor belt 2.81 to the upper conveyor belt TB.1 of the primary conveying device PF requires no special device, rather the material is simply delivered in steps.

As indicated with dot-dash lines in FIG. 5, this arrangement allows provision of the secondary conveying device 2.8 with a slewing device along with a slewing control and drive unit 2.3. Thus the end of the secondary conveying device 2.8 close to the autoclave follows a continuous motion of the trays T in the autoclave. This eliminates the expensive quadrant drive for the rapid motion of the brackets as well as the control unit for the stepwise movement of the trays T. The trays can be conducted around in the autoclave with uniform speed and loading and unloading are carried out with the following secondary conveying device 2.8.

As shown in FIG. 7, the same slewing device 2.2 can be used to run the secondary conveying device 2.8 out of the loading and unloading area, so that the cover of the autoclave, which is located above the autoclave cylinder during loading and unloading, can be slewed in front of the autoclave port for closure.

If maintenance and/or repairs have to be carried out on the conveyor F in the autoclave, the entire assembly of the conveyor F will have to be able to be run out of the cylinder. However, this is possible only if the column 1.9 or the carrier frame is not in front of the loading and unloading port, but is rather shifted to the side.

I claim:

1. A loading and unloading arrangement for conveying piece goods to and from a conveyor, the conveyor comprising means for moving a goods holder, said arrangement comprising:
   (a) a primary conveying device for conducting the piece goods to and from a conveyor loading and unloading device;
   (b) a feeder for delivering and receiving piece goods to and from said primary conveying device;
   (c) upper and lower working platforms including respective transfer devices, said transfer devices for transferring the piece goods from the feeder to respective goods holders of the conveyor, and for transferring piece goods from the feeder to the primary conveying device of the conveyor loading and unloading device; and
   (d) a positioning device comprising a displacement car arranged for vertical movement along a column, said displacement car having upper and lower brackets attached thereto for supporting respective upper and lower working platforms; said positioning device further including a control and drive unit for driving the displacement car.

2. An arrangement according to claim 1, and including means associated with said transfer devices for loading and removing piece goods to and from the goods holders.

3. A loading and unloading arrangement for conveying piece goods to and from a conveyor, the conveyor comprising means for moving a goods holder, said arrangement comprising:
   (a) a primary conveying device for conducting the piece goods to and from a conveyor loading and unloading device;
   (b) a feeder including upper and lower conveying devices for receiving piece goods from the primary conveying device and moving the piece goods to the conveyor, and for receiving piece goods from the conveyor and moving the piece goods to the primary conveying device;
   (c) a first transfer device for transferring the piece goods from the primary conveying device to the feeder, and a second transfer device for transferring the piece goods from the goods holder of the conveyor to the feeder; and
   (d) a positioning device comprising a slewing device mounted on a carrier frame for supporting the upper and lower conveying devices, said slewing device being held in a stationary condition on the carrier frame for being slewed in a rest position out of the area in front of the conveyor.

4. An arrangement according to claim 3, wherein the slewing device includes means for continuously following the movement of the goods holders, and means for abruptly resetting to the starting position for the loading and unloading time for continuous operation of the conveyor.

5. An arrangement according to claim 3, wherein the first transfer device is arranged close to the primary conveying device, and the second transfer device for is arranged close to the conveyor.

* * * * *